United States Patent
Yamashita et al.

(10) Patent No.: US 8,960,879 B2
(45) Date of Patent: Feb. 24, 2015

(54) INK JET INK, INK CARTRIDGE, AND INK JET RECORDING METHOD

(75) Inventors: Yoshihisa Yamashita, Kawasaki (JP); Takashi Saito, Yokohama (JP); Tsuyoshi Furuse, Isehara (JP); Nobuyuki Matsumoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 13/291,984

(22) Filed: Nov. 8, 2011

(65) Prior Publication Data

US 2012/0127233 A1 May 24, 2012

(30) Foreign Application Priority Data

Nov. 18, 2010 (JP) .................. 2010-258196

(51) Int. Cl.
| | |
|---|---|
| *B41J 2/01* | (2006.01) |
| *C09D 11/322* | (2014.01) |
| *B41J 2/21* | (2006.01) |
| *C09D 11/326* | (2014.01) |
| *C08K 5/00* | (2006.01) |

(52) U.S. Cl.
CPC ............ *C09D 11/322* (2013.01); *B41J 2/2107* (2013.01); *C09D 11/326* (2013.01); *C08K 5/0091* (2013.01)
USPC .............................. 347/100; 347/95; 523/160

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101
USPC ........ 347/100, 95, 96, 88, 99, 21, 20, 9, 102; 106/31.6, 31.27, 31.13; 523/160, 161
See application file for complete search history.

(56) References Cited

U.S. PATENT DOCUMENTS

| | | | |
|---|---|---|---|
| 2007/0188572 A1* | 8/2007 | Takayama et al. | 347/100 |
| 2009/0202724 A1* | 8/2009 | Arai et al. | 106/31.86 |
| 2010/0253734 A1* | 10/2010 | Ikeda et al. | 347/21 |

FOREIGN PATENT DOCUMENTS

| | | |
|---|---|---|
| JP | 2001-354886 A | 12/2001 |
| JP | 2007-246890 A | 9/2007 |

\* cited by examiner

*Primary Examiner* — Manish S Shah
(74) *Attorney, Agent, or Firm* — Canon U.S.A., Inc. IP Division

(57) ABSTRACT

An ink jet ink contains a resin A, a resin B, and a pigment, in which the pigment is a halogenated metal phthalocyanine pigment being dispersed by the resin B, the resin A is a random copolymer having a carboxy group, the resin B is a block copolymer having a carboxy group, the acid value of the resin A is less than the acid value of the resin B, and the ink further includes a polybasic acid having a functional group whose pKa is 4.3 or less and a functional group whose pKa is 5.0 or more and 6.6 or less.

15 Claims, No Drawings

INK JET INK, INK CARTRIDGE, AND INK JET RECORDING METHOD

BACKGROUND OF THE INVENTION

1. Field of the Invention

The present invention relates to an ink jet ink suitable also as a green ink and an ink cartridge and an ink jet recording method using the ink.

2. Description of the Related Art

In recent years, pigments have been widely used as color materials of inks for use in ink jet recording methods because the fastness properties of images to be obtained are excellent. However, there is a tendency that the pigments are inferior to dyes in the color developability. In order to obtain images having rich color by inks containing pigments, so-called special color inks, such as red, green, and blue inks, have been used in addition to cyan, magenta, and yellow which are base colors of subtractive color mixture. Known as pigments for use in a green ink among the above is a halogenated metal phthalocyanine pigment (Japanese Patent Laid-Open Nos. 2001-354886 and 2007-246890).

However, it has been found that when the halogenated metal phthalocyanine pigment is used as color materials of inks for use in ink jet recording methods, sufficient ejection properties are not obtained in some cases. In recent years, images to be obtained by ink jet recording methods have been strongly demanded to have higher definition than ever before. However, since a reduction in the ejection properties considerably affects the image quality, an improvement thereof is required.

SUMMARY OF THE INVENTION

Aspects of the present invention provide an ink whose ejection properties in an ink jet method have been improved and an ink cartridge and an ink jet recording method using the ink.

Objectives that may be achieved by aspects of the invention described below. More specifically, an ink according to the invention is an ink jet ink containing a resin A, a resin B, and a pigment, in which the pigment is a halogenated metal phthalocyanine pigment being dispersed by the resin B, the resin A is a random copolymer having a carboxy group, the resin B is a block copolymer having a carboxy group, the acid value of the resin A is less than the acid value of the resin B, and the ink includes a polybasic acid having a functional group whose pKa is 4.3 or less and a functional group whose pKa is 5.0 or more and 6.6 or less.

Further features of the present invention will become apparent from the following description of exemplary embodiments.

DESCRIPTION OF THE EMBODIMENTS

Hereinafter, the invention is described in more detail with reference to embodiments for carrying out the invention. Various kinds of physical properties, such as pH and pKa, according to aspects of the invention are values at 25° C.

First, the present inventors have examined a technical problem in an ink jet ink containing a halogenated metal phthalocyanine pigment suitable as a color material of a green ink, such as a reduction in the ejection properties peculiar to the pigment.

In a metal phthalocyanine pigment having a green hue, a halogen atom is substituted in the aromatic ring of the phthalocyanine skeleton, unlike a common metal phthalocyanine pigment having the cyan hue. Therefor, the surface properties of halogenated metal phthalocyanine pigment particles exhibit peculiar properties which cannot be described in terms of a simple hydrophilic-hydrophobic relationship. Moreover, there is a tendency that, even when a resin dispersant exhibiting a sufficiently dispersing capability in the case of common pigments is used, the resin dispersant is hard to be adsorbed to the particle surface of the halogenated metal phthalocyanine pigment, resulting in the fact that the dispersion state is likely to become unstable. When an ink containing the above-described pigment is used for ink jet recording methods in which strong shearing force is applied in ejection, the resin dispersant is likely to be separated from the particle surface. When ejection energy is imparted to such an ink, a part of the energy is consumed for the separation of the resin dispersant, so that the energy which can be used for ejecting the ink decreases. As a result, it has been found that the ejection rate decrease and a deposit resulting from the separated resin is generated, for example, which causes a reduction in the ejection properties. Then, the present inventors have conducted an examination for making the resin dispersant sufficiently adhere to the particle surface of the halogenated metal phthalocyanine pigment. As a result, the present inventors have found that it is effective to disperse the pigment by the block copolymer (resin B) having a carboxy group, further add the random copolymer (resin A) having a carboxy group to the ink, and reduce the acid value of the resin A to be lower than the acid value of the resin B.

In general, the ratio of hydrophobic units is higher in resin having a low acid value than in resin having a high acid value. Therefore, the resin having a low acid value is likely to be adsorbed to the surface of pigment particles. Therefore, when considering only the relationship of the acid value, a hydrophobic interaction with the surface of pigment particles is stronger in the resin A having a relatively low acid value, and thus the resin A is likely to be adsorbed to the pigment. However, the ease of adsorption of resin to the surface of pigment particles, the form of the resin is more dominant than the acid value of the resin. More specifically, even when the acid value is relatively high, the resin B, whose form is a block copolymer, is more likely to be adsorbed to the surface of pigment particles than the resin A which is a random copolymer.

Here, when the resin A is present in the ink in addition to the resin B, the resin A having a relatively low acid value makes an attempt to approach the surface of the pigment particles due to a hydrophobic interaction. However, as described above, the adsorbability of the block copolymer to the surface of the pigment particles is higher than that of the random copolymer, and therefore the replacement with the block copolymer which disperses the pigment does not occur. Rather, the fact that the resin A having a relatively low acid value makes an attempt to approach the surface of the pigment particles comes to act as an apparent power with which the block copolymer which is adsorbed to the surface of the pigment particles is more strongly pressed by the pigment. Then, even in the case of the halogenated metal phthalocyanine pigment to which resin is harder to be adsorbed than common metal phthalocyanine pigments, the separation of the block copolymer which is adsorbed to the surface of the pigment particles is suppressed, and the ejection properties are improved.

However, as a result of the examination of the present inventors, it has been found that the random copolymer forms micelles in ink depending on the pH of the ink, a water-soluble organic solvent to be used, or the like to reduce the action of more strongly pressing the block copolymer to the pigment in some cases. More specifically, only when the block copolymer and the random copolymer are used in combination, the effect of improving the ejection properties is not demonstrated in some cases. Then, the present inventors have focused attention on the pKa (acid dissociation constant) as a method for suppressing the micellization of the random copolymer. In the micelles formed by the random copolymer, hydrophobic portions gather, and carboxy groups present thereinside are not ionized and are present in the state of acid form (—COOH). In order to destroy the micelles to dissolve the random copolymer, carboxylic acids in the micelles are required to be ionized, i.e., the carboxy groups of acid form need to be neutralized. The pKa of the carboxy group of acid form is presumed be equal to the pKa (4.5) of polyacrylic acid. Therefore, in order to ionize the carboxy group of acid form, it is considered to be effective to blend a compound containing acid which is ionized in the ink and is weaker than the same, i.e., an acidic group having a high pKa.

The present inventors have examined various compounds different in the pKa. As a result, the present inventors have found that polybasic acid having a functional group whose pKa is 4.3 or less and a functional group whose pKa is 5.0 or more and 6.6 or less is effective for ionizing the carboxy group of acid form of the random copolymer forming micelles. More specifically, not only a functional group (weak acid) whose pKa is more than that of polyacrylic acid and is 5.0 or more and 6.6 or less but also a functional group (strong acid) having a low pKa whose pKa is equal to or less than that of polyacrylic acid is required. Moreover, it is also required that both of the two kinds of acid functional groups are present in one molecule. In contrast, even when a compound of both basic acid having only a functional group whose pKa is 4.3 or less and basic acid having only a functional group whose pKa is 5.0 or more and 6.6 or less is compounded in the ink, the carboxy group of acid form has not been ionized.

The present inventors guess as follows the reason why the use of the polybasic acid having a functional group whose pKa is 4.3 or less and a functional group whose pKa is 5.0 or more and 6.6 or less allows neutralization of the carboxy group of acid form of the random copolymer forming micelles. First, in order for a compound having two kinds of acid functional groups to enter the inside of the micelles, the compound needs to have sufficient solubility, for which the compound needs to have an acid functional group having a certain low pKa. Moreover, in order to ionize the carboxy group of acid form, the compound needs to have an acid functional group having a certain high pKa. Here, the reason why there is an upper limit in the pKa (6.6 or less) in the acid functional group having a high pKa resides in the fact that when the pKa is extremely high, the probability that the compound is present in an ionized state in the ink becomes low. In this case, the carboxy group of acid form cannot be neutralized by the polybasic acid.

As described above, aspects of the invention involve the use of the polybasic acid having a functional group whose pKa is 4.3 or less and a functional group whose pKa is 5.0 or more and 6.6 or less. The use of such a polybasic acid destroys the micelles of the random copolymer formed under the influence of the pH of the ink, the water-soluble organic solvent to be used, and the like. Then, the action in which the separation of the block copolymer from the pigment is suppressed by the random copolymer is demonstrated irrespective of the conditions, such as the pH of the ink or the water-soluble organic solvent to be used, and therefore the ejection properties of ink can be improved.

Ink

Hereinafter, components and the like constituting the ink according to aspects of the invention are described. Halogenated metal phthalocyanine pigment In the ink according to aspects of the invention, a halogenated metal phthalocyanine pigment (hereinafter sometimes referred to as a pigment) is compounded as a color material. The content (% by mass) of the halogenated metal phthalocyanine pigment in the ink is suitably 1.0% by mass or more and 20.0% by mass or less are and more suitably 2.0% by mass or more and 8.0% by mass or less based on the total mass of the ink.

The halogenated metal phthalocyanine pigment has a structure in which at least some of 16 hydrogen atoms in total bonded to four aromatic rings positioned at the outside of the phthalocyanine skeleton are substituted by halogen atoms and two hydrogen atoms at the central portion of the phthalocyanine skeleton are substituted by metal atoms. As the halogen atoms, chlorine, bromine, iodine, and the like are mentioned and a plurality of kinds of halogen atoms may substitute the hydrogen atoms. In the invention, one in which at least one of chlorine and bromine substitutes the hydrogen atoms as the halogen atom is suitable and one in which both of chlorine and bromine substitute the hydrogen atoms is more suitable. The number of substituent of the halogen atoms to the four aromatic rings of the phthalocyanine skeleton is suitably 8 or more, more suitably 12 or more, and particularly suitably 14 or more among the 16 hydrogen atoms. Thus, the halogenated metal phthalocyanine pigment having a high degree of halogenation has a hue suitable as a green ink and thus is particularly suitable. Mentioned as the central metal of the phthalocyanine skeleton are copper, zinc, aluminum, and the like and copper or zinc is particularly suitable according to aspects of the invention. Specific examples of the halogenated metal phthalocyanine pigment are shown in Table 1. It is a matter of course that the invention is not limited thereto.

TABLE 1

Specific examples of metal phthalocyanine pigment

| | Number of substituent with halogen atoms | Center metal | Reference (Examples of C.I. Number) |
|---|---|---|---|
| Halogenated metal phthalocyanine pigment | 14 to 15 | Copper | C.I. Pigment Green 7 |
| | 14 to 16 | Copper | C.I. Pigment Green 36 |
| | 8 | Copper | C.I. Pigment Green 37 |
| | 14 to 16 | Zinc | C.I. Pigment Green 58 |
| Metal phthalocyanine pigment (reference) | 0 | Copper | C.I. Pigment Blue 15:3 |

Resin

In the ink according to aspects of the invention, the random copolymer having a carboxy group (resin A) as the resin to be added to the ink and the block copolymer having a carboxy group (resin B) as the resin dispersant for dispersing the pigment described above are compounded.

Here, features of the random copolymer and the block copolymer are described. The random copolymer is constituted from units derived from two or more kinds of monomers and has a structure in which each unit is irregularly arranged. The block copolymer is also constituted from units derived from two or more of kinds of monomers but has a structure a plurality of units derived from monomers of the same type or monomers having the same properties are connected to form blocks and a plurality of blocks are arranged. The block copolymer generally used in an ink jet ink is a copolymer having the following structure. For example, an AB block structure having a hydrophobic block (A block) and an ionic hydrophilic block (B block) or an ABC block structure in which a nonionic hydrophilic block (C block) is further added to the AB block structure are mentioned.

Random Copolymer Having Carboxy Group (Resin A)

The random copolymer having a carboxy group (resin A) that is to be compounded in the ink according to aspects of the invention is described. The resin A needs to have an acid value less than the acid value of the block copolymer having a carboxy group (resin B) described later. According to aspects of the invention, the resin A is used as the resin to be added to the ink. However, when the resin B mainly contributes to the dispersion of the pigment, a small portion of the resin A may contribute to the dispersion of the pigment. As described above, the adsorbability to the surface of the pigment particles of the block copolymer is higher than that of the random copolymer. Therefore, the replacement with the block copolymer which disperses the pigment does not generally occur.

As described above, the random copolymer is different in the structure from the block copolymer described later in that the hydrophobic portion or the hydrophilic portion is not present as a block but has each of the hydrophobic portion and the hydrophilic portion similarly as the block copolymer. Therefore, the random copolymer is also constituted by a hydrophobic unit and a hydrophilic unit. The random copolymer for use according to aspects of the invention has a carboxy group. Therefore, any hydrophobic unit may be acceptable insofar as it is constituted including at least a unit having a carboxy group as the hydrophilic unit. According to aspects of the invention, it is particularly suitable that all the acidic units constituting the random copolymer are units having a carboxy group. The random copolymer for use in the ink according to aspects of the invention can be synthesized by standard methods, such as various kinds of ion polymerization methods or radical polymerization methods. According to aspects of the invention, the weight average molecular weight of the resin A is suitably 2,000 or more and 20,000 or less and more suitably 3,000 or more and 10,000 or less.

Resin B: Block Copolymer Having Carboxy Group

The block copolymer having a carboxy group (resin B) which is to be compounded in the ink according to aspects of the invention is described. As described above, the acid value of the resin A needs to be less than the acid value of the resin B. According to aspects of the invention, the resin B is used as a resin dispersant for dispersing the pigment. Therefore, the block copolymer has a hydrophobic portion constituted by a plurality of hydrophobic units and a hydrophilic portion constituted by a plurality of hydrophilic units. The block copolymer for use according to aspects of the invention also has a carboxy group. Therefore, any hydrophobic unit may be acceptable insofar as it is constituted including at least a unit having a carboxy group as the hydrophilic unit. The block copolymer for use in the ink according to aspects of the invention can be synthesized by standard methods, such as an anion or cation living polymerization method, a group transfer polymerization method, an atom transfer radical polymerization method, and a reversible addition fragmentation chain transfer polymerization method. According to aspects of the invention, the weight average molecular weight of the resin B is suitably 2,000 or more and 20,000 or less.

Monomer Serving as Unit Constituting Each Resin

It is suitable for the resin A and the resin B to be compounded in the ink according to aspects of the invention to have at least the hydrophilic unit and the hydrophobic unit described below as a constituent unit. Specifically, when a required amount of a unit derived from a monomer having a carboxy group is given to each resin in such a manner as to satisfy the relationship of the acid value of the resin A and the resin B, units derived from monomers selected from the groups described below as appropriate can be used other than the monomer described above. In the following description, (meth)acryl refers to acryl and methacryl.

Mentioned as monomers forming the hydrophilic unit by polymerization are, for example, monomers having carboxy groups, such as (meth)acrylic acid, itaconic acid, maleic acid, and fumaric acid, monomers having phosphonic acid groups, such as 2-phosphonic acid ethyl(meth)acrylate, monomers having sulfonic acid groups, such as 4-styrene sulfonic acid and 2-acrylamide-2-methylpropanesulfonic acid, anionic monomers, such as anhydrides or salts of these acid monomers, monomers having hydroxy groups, such as 2-hydroxyethyl(meth)acrylate and 3-hydroxy propyl(meth)acrylate acid, monomers having ethylene oxide groups, such as (mono-, di-, tri-, tetra-, poly-)ethylene glycol mono(meth)acrylates, and monomers having amide groups, such as (meth)acrylamide, N-methylol(meth)acryl amide, N-vinyl formamide, N-vinyl acetamide, and N-vinyl pyrrolidone. Mentioned as a cation constituting salts of anionic monomers are ions, such as lithium, sodium, potassium, ammonium, and organic ammonium.

Mentioned as monomers forming hydrophobic unit by polymerization are monomers having aromatic rings, such as styrene, α-methylstyrene, 4-chloromethylstyrene, 4-tert-butylstyrene, benzyl(meth)acrylate, naphthyl(meth)acrylate, and vinyl naphthalene and monomers having aliphatic groups, such as ethyl(meth)acrylate, methyl(meth)acrylate, (iso)propyl(meth)acrylate, (n-, iso-, sec-, tert-) butyl(meth)acrylate, 2-ethylhexyl(meth)acrylate, dimethyl maleate, dimethyl itaconate, and dimethyl fumarate. Suitable acid value of each resin and relationship thereof According to aspects of the invention, the acid value of the resin A needs to be less than the acid value of the resin B. The acid value of each resin is not limited insofar as the relationship is satisfied. According to aspects of the invention, it is suitable that the acid value of the resin A is 100 mgKOH/g or more and 180 mgKOH/g or less and the acid value of the resin B is 140 mgKOH/g or more and 250 mgKOH/g or less. The acid value of the resin is the amount (mg) of potassium hydroxide required for neutralizing acidic groups contained in 1 g of the resin. According to aspects of the invention, it is suitable for the resin A and the resin B to have water solubility. In the invention, it is supposed that the fact that the resin is water soluble refers to the fact that when the resin is neutralized with alkali equivalent to the acid value, the resin does not have a particle size. The resin satisfying such conditions is referred to as water-soluble resin in this description. As a result of the examination of the present inventors, it has been found that, in order to further improve the ejection properties of the ink, it is suitable to establish the relationship of the acid value of the resin A and the resin B as follows. More specifically, the acid value of the resin A (random copolymer to be added to the ink) is suitably 0.60 or more and 0.85 or less in terms of ratio to the acid value of the resin B (block copolymer which disperses the pigment). More specifically, the value of (Acid value of Resin A/Acid value of Resin B) is suitably 0.60 or more and 0.85 or less. When the ratio is less than 0.60, deposits cannot be suppressed with a sufficient level, and thus the effect of further improving the ejection properties is not obtained in some cases. In contrast, when the ratio is more than 0.85, the ejection rate is a little likely to decrease when the ink is continuously ejected, for example, and thus the effect of further improving the ejection properties is not obtained in some cases.

Suitable Content of Each Resin and Relationship Thereof

According to aspects of the invention, the content (% by mass) of the resin A in the ink is suitably 0.1% by mass or more and 5.0% by mass or less based on the total mass of the ink. The content (% by mass) of the resin B in the ink is suitably 0.1% by mass or more and 5.0% by mass or less based on the total mass of the ink.

As a result of the examination of the present inventors, it has been found that, in order to further improve the ejection properties of the ink, it is suitable to establish the relationship of the content of the resin A and the content of the resin B as follows. More specifically, the content (% by mass) of the resin A in the ink is suitably 0.05 times or more and 1.50 times or less the content of the resin B in terms of mass ratio to the content (% by mass) of the resin B. More specifically, the value of (Content of Resin A/Content of Resin B) is suitably 0.05 or more and 1.50 or less. The content of the resin A and the content of the resin B in this case are values based on the total mass of the ink. When the mass ratio is less than 0.05 times, the effect of further improving the ejection properties is not sufficiently obtained in some cases. In contrast, when the mass ratio becomes high, the ratio of the resin A (random copolymer) relatively increases. Therefore, when the mass ratio is more than 1.50 times, the generation of deposits cannot be more effectively suppressed, which sometimes results in a failure of obtaining the effect of further improving the ejection properties. Analysis of resin dispersant and resin to be added The type of resin which disperses the halogenated metal phthalocyanine pigment in the ink according to aspects of the invention can be found by the method described below. First, the ink is separated into a component containing the pigment as a precipitate and a water-soluble component which is a supernatant by centrifugal separation of the ink at 20,000 rpm for 2 hours. Then, the resin present in the component containing the pigment is analyzed as follows. The component containing the pigment separated by the centrifugal separation is dispersed in water again, and then hydrochloric acid or the like is added thereto for acid deposition. The deposit is separated by centrifugal separation, filtration, or the like to thereby obtain a solid. The solid is subjected to Soxhlet extraction with organic solvents, such as tetrahydrofuran, to thereby obtain resin. The obtained resin is analyzed by NMR or the like. Specifically, the composition of the copolymer can be analyzed by confirming the peak peculiar to monomers. In the case of the block copolymer, a clear peak can be observed. In contrast, in the case of the random copolymer, the peak is broad. Therefore, the form of the resin can also be analyzed by NMR. By such a method, the type of the resin dispersant of the pigment can be found. Moreover, by analyzing the resin present in the water-soluble component obtained after the first centrifugal separation, the type of the resin to be added to the ink can be found.

Polybasic Acid

In the ink according to aspects of the invention, a polybasic acid having a functional group whose pKa is 4.3 or less and a functional group whose pKa is 5.0 or more and 6.6 or less pKa in its molecular structure. When at least the polybasic acid is contained in the ink, basic acid other than the polybasic acid may also be contained in the ink insofar as the effects according to aspects of the invention are not impaired. The pKa of the functional group having a lower pKa is suitably 1.5 or more.

The polybasic acid refers to acid which gives a plurality of protons (Bronsted acid). The polybasic acid has a plurality of acidic functional groups in the structure, and therefore has a plurality of pKa values. The "pKa" specified according to aspects of the invention is one of the indices for quantitatively representing the strength of acid and is also referred to as an acid dissociation constant or an acidity constant. Considering a dissociative reaction in which hydrogen ions are emitted from acid, the "pKa" is indicated by a negative common logarithm pKa. A smaller pKa indicates that the acid is stronger. According to aspects of the invention, the pKa is a value at 25° C. (Room temperature).

Specific examples of polybasic acid which satisfies the above-described pKa requirements and can be suitably used according to aspects of the invention and the pKa and the molecular weight thereof are shown in Table 2. It is a matter of course that the invention is not limited thereto. According to aspects of the invention, the pKa value of the polybasic acid refers to the description of "Kagaku Binran (Handbook of Chemistry) Kisohen (Basic) Revised 5th ed., Maruzen, 2004, pp. II-340-343". According to aspects of the invention, in order for the polybasic acid to enter the inside of the micelles of the random copolymer, polybasic acid having a molecular weight of 300 or less is more suitably used. The molecular weight of the polybasic acid is suitably 100 or more.

TABLE 2 pKa and molecular weight of polybasic acid

| | pKa | | | | Molecular weight |
|---|---|---|---|---|---|
| Citric acid | 2.9 | 4.4 | 5.7 | | 192.12 |
| Ethylenediamine tetraacetic acid | 2.0 | 2.7 | 6.4 | 10.3 | 292.24 |
| Ethylenediamine-N,N'-diacetic acid | 2.4 | 6.6 | 9.7 | | 176.17 |
| Maleic acid | 1.8 | 5.8 | | | 116.07 |
| Succinic acid | 4.0 | 5.2 | | | 118.09 |
| Malonic acid | 2.6 | 5.3 | | | 104.06 |
| Adipic acid | 4.3 | 5.0 | | | 146.14 |
| Glutaric acid | 4.1 | 5.0 | | | 132.12 |
| Cyclohexane-1,1-dicarboxylic acid | 3.3 | 5.7 | | | 172.18 |
| Trans-1,2-cyclohexane diamine tetraacetic acid | 2.4 | 3.4 | 5.9 | 11.8 | 346.34 |

According to aspects of the invention, it is suitable that the content (% by mass) of the polybasic acid in the ink is suitably 0.0010% by mass or more and 0.500% by mass or less based on the total mass of the ink.

The present inventors have examined based on the consideration that, from the viewpoint of suppressing the micellization of random copolymers by the polybasic acid, when the ratio thereof establishes a suitable relationship, the effect of further improving the ejection properties is obtained. As a result, it has been found that the amount y (mmol/kg) of functional groups in which the pKa of the polybasic acid is 5.0 or more and 6.6 or less is suitably 0.013 or more and 1.000 or less in terms of the ratio (y/x) to the amount x (mmol/kg) of carboxy groups of the random copolymer (resin A). When the ratio is less than 0.013, the action of ionizing the carboxy group of acid form of the random copolymer is a little likely to decrease, and thus the effect of further improving the ejection properties is not obtained in some cases. In contrast, when the ratio is more than 1.000, deposits are likely to generate due to salting out, and therefor the effect of further improving the ejection properties is not obtained in some cases.

The value of the ratio (y/x) can be calculated as follows. The y value is determined in terms of the unit of mmol/kg utilizing the acid value (mgKOH/g) of the random copolymer (resin A), the content (% by mass) thereof in the ink, and the molecular weight (56.11) of potassium hydroxide. The x value is determined in terms of the unit of mmol/kg utilizing the molecular weight of the polybasic acid, the content (% by mass) thereof in the ink, and the number of the functional groups whose pKa is 5.0 or more and 6.6 or less. The acid value and the value of the content of the random copolymer contained in the ink required for the calculation can be found out by the resin analysis method described above. The type and the value of the content of the polybasic acid contained in the ink can be found out by analyzing, by liquid chromatography, the structure and the amount of a liquid component excluding precipitates (pigment and resin dispersant) obtained in the resin analysis method described above.

Aqueous Medium

According to aspects of the ink of the invention, water or an aqueous medium which is a mixed solvent of water and a water-soluble organic solvent can be compounded. As the water, deionized water is suitably used. The content (% by mass) of the water in the ink is suitably 40.0% by mass or more and 90.0% by mass or less based on the total mass of the ink. As the water-soluble organic solvent, any substance usable in ink jet inks, such as alcohols, glycols, glycol ethers, and nitrogen-containing compounds, can be used. One or two or more kinds thereof can be compounded in the ink. The content (% by mass) of the water-soluble organic solvent in the ink is suitably 3.0% by mass or more and 50.0% by mass or less and more suitably 3.0% by mass or more and 40.0% by mass or less based on the total mass of the ink.

Other Components

According to aspects of the ink of the invention, organic compounds which are in a solid state at room temperature, such as trimethylol ethane and trimethylolpropane or nitrogen-containing compounds, such as urea and ethylene urea, may be compounded as required in addition to the components. In addition to the components, various additives, such as a surfactant, a pH adjuster, an antifoaming agent, a rust-preventive agent, an antiseptic, a mildewproofing agent, an antioxidant, a reduction prevention agent, an evaporation accelerator, and a chelating agent, may be further compounded in the ink. In particular, in order to promptly infiltrate the liquid component in the ink into a recording medium, an appropriate amount of a surfactant is suitably compounded.

pH of Ink

The ink according to aspects of the invention is suitably adjusted to be neutral to alkaline. Thus, the solubility of the block copolymer, the random copolymer, and the polybasic acid in the aqueous medium can be increased, and the long-term storage properties of the ink can be further increased. Therefor, the pH of the ink is suitably 7.0 or more. However, various members constituting an ink jet recording device are subjected to corrosion in some cases, and therefore the pH of the ink is suitably 10.0 or less.

Method for Preparing Ink

The ink according to aspects of the invention can be prepared in accordance with standard methods. However, since the halogenated metal phthalocyanine pigment needs to be dispersed by the block copolymer (resin B), the ink according to aspects of the invention is suitably prepared by the following procedure. First, a pigment is added to a mixture containing the block copolymer (resin B) which is the resin dispersant of the pigment and water, and then stirred. Thereafter, the mixture is dispersed, and, as required, subjected to centrifugal separation, thereby obtaining a pigment dispersion liquid. Next, the pigment dispersion liquid obtained above, an aqueous medium (water or a water-soluble organic solvent), the random copolymer (resin A) to be added to the ink, other components, as required, and the like are added and stirred, thereby obtaining the ink.

Ink Cartridge

An ink cartridge according to aspects of the invention has an ink storing portion for storing ink, in which the ink according to aspects of the invention described above is stored in the ink storing portion. Mentioned as a structure of the ink cartridge is one in which the ink storing portion is constituted by an ink storing chamber for storing a liquid ink and a negative pressure generating member storing chamber for storing a negative pressure generating member for holding the ink thereinside by a negative pressure. Or, an ink cartridge may be acceptable which is an ink storing portion having a structure in which an ink storing chamber for storing a liquid ink is not provided and the total storage amount is held by a negative pressure generating member. Furthermore, an ink cartridge may be acceptable which is configured to have an ink storing portion and a recording head.

Ink Jet Recording Method

An ink jet recording method according to aspects of the invention is a method including ejecting the ink according to aspects of the invention described above by an ink jet recording head, and recording an image on a recording medium. Mentioned as an ink ejecting method is a method of imparting dynamic energy to ink or a method of imparting thermal energy to ink. According to aspects of the invention, it is particularly suitable to employ an ink jet recording method utilizing thermal energy. Except using the ink according to aspects of the invention, processes of the ink jet recording method may be known processes. According to aspects of the invention, it is suitable to use, as a recording medium, paper having ink absorption ability, such as a regular paper or a recording medium having an ink receiving layer.

The ink according to aspects of the invention can be combined with another ink to also be used as an ink set. As the hue of another ink, one or two or more hues can be selected from cyan ink, magenta ink, yellow ink, black ink, red ink, green ink, blue ink, and the like. As inks constituting the ink set, a plurality of inks which have the same hue as that of the ink and in which the content of pigments is different from each other may be used.

EXAMPLES

Hereinafter, aspects of the present invention are described with reference to Examples, Reference Examples, and Comparative Examples in more detail but the present invention is not limited to the following Examples. Unless otherwise specified, "part" and "%" indicating the amount of components are based on mass.

Synthesis of Resin

Water-soluble resins having the composition (mass) ratio of units shown in the upper row of Table 3 were synthesized using monomers by standard methods. The results obtained by measuring the obtained resins for the weight average molecular weight by gel permeation chromatography and the acid value by potentiometric titration are shown in the lower row of Table 3.

TABLE 3

Composition and properties of resin

| | | Random copolymer | | | | Block copolymer | | |
|---|---|---|---|---|---|---|---|---|
| | | A1 | A2 | A3 | A4 | B1 | B2 | B3 |
| Composition (mass) ratio of units constituting resin | Stylene | 45.0 | 50.0 | 53.0 | 41.0 | | | |
| | n-butyl acrylate | 20.0 | 20.0 | 20.0 | 20.0 | | | |
| | 2-hydroxyethyl acrylate | 12.0 | 12.0 | 12.0 | 12.0 | | | |
| | Benzyl methacrylate | | | | | 70.0 | 79.0 | 76.0 |
| | Acrylic acid | 20.0 | 15.0 | 12.0 | 24.0 | | | |
| | Methacrylic acid | | | | | 30.0 | 21.0 | 24.0 |
| Properties of resin | Weight average molecular weight | 6,800 | 6,100 | 6,300 | 6,800 | 5,200 | 5,600 | 5,200 |
| | Acid value [mgKOH/g] | 160 | 120 | 108 | 190 | 190 | 140 | 160 |

Preparation of Pigment Dispersion Liquid

A mixture of the components (unit: part) shown in the upper row of Table 4 was put into a batch type vertical sand mill (manufactured by AIMEX), 85.0 parts of zirconia beads having a diameter of 0.3 mm were charged therein, and then dispersion was performed for 3 hours under water cooling. Each resin was neutralized using potassium hydroxide equivalent to the acid value thereof to be used as a solid. Thereafter, non-dispersion substances containing coarse particles were removed by centrifugal separation. Furthermore, the resultant substances were diluted using an appropriate amount of ion exchange water, and pressure filtration was performed using a micro filter having a pore size of 3.0 μm (manufactured by FUJIFILM Corporation), thereby obtaining each pigment dispersion liquid in which the contents (unit: %) of the pigment and the resin are values shown in the lower row of Table 4.

Preparation of Ink

The components (unit: %) shown in the upper row of Tables 5 to 7 were mixed and sufficiently stirred. Thereafter, the mixture was subjected to pressure filtration with a micro filter having a pore size of 2.5 μm (manufactured by Paul), thereby preparing each ink. Used as an aqueous solution containing resin was an aqueous solution in which the resin synthesized above was neutralized with potassium hydroxide equivalent to the acid value thereof and the content of the resin (solid content) was 10.0%. Acetylenol E100 is a non-ionic surfactant manufactured by Kawaken Fine Chemicals. The lower rows of Tables 5 to 7 show main properties of each ink, such as the acid value or the content of the resin A (resin to be added to the ink) and the resin B (resin dispersant). The amount of functional groups of polybasic acid refers to the amount of functional groups in which the pKa of the polybasic acid is 5.0 or more and 6.6 or less.

TABLE 4

Preparation of pigment dispersion liquid

| | Pigment dispersion liquid No. | | | | | | | | | |
|---|---|---|---|---|---|---|---|---|---|---|
| | 1 | 2 | 3 | 4 | 5 | 6 | 7 | 8 | 9 | 10 |
| Pigment 1 (Number of substituent with halogen atoms: 14 to 15, C.I. Pigment Green 7) | 15.0 | 15.0 | 15.0 | 15.0 | 15.0 | 15.0 | | | | |
| Pigment 2 (Number of substituent with halogen atoms: 14 to 16, C.I. Pigment Green 36) | | | | | | | 15.0 | | | |
| Pigment 3 (Number of substituent with halogen atoms: 8, C.I. Pigment Green 37) | | | | | | | | 15.0 | | |
| Pigment 4 (Number of substituent with halogen atoms: 14 to 16, C.I. Pigment Green 58) | | | | | | | | | 15.0 | |
| Pigment 5 (Number of substituent with halogen atoms: 0, C.I. Pigment Blue 15:3) | | | | | | | | | | 15.0 |
| Random copolymer A1 (160 mgKOH/g) | | | | | 10.0 | | | | | |
| Random copolymer A4 (190 mgKOH/g) | | | | | | 10.0 | | | | |
| Block copolymer B1 (190 mgKOH/g) | 10.0 | | 7.5 | | | | 10.0 | 10.0 | 10.0 | 10.0 |
| Block copolymer B2 (140 mgKOH/g) | | 10.0 | | | | | | | | |
| Block copolymer B3 (160 mgKOH/g) | | | | 10.0 | | | | | | |
| 2-pyrrolidone | 10.0 | 10.0 | 10.0 | 10.0 | 10.0 | 10.0 | 10.0 | 10.0 | 10.0 | 10.0 |
| Ion exchange water | 65.0 | 65.0 | 67.5 | 65.0 | 65.0 | 65.0 | 65.0 | 65.0 | 65.0 | 65.0 |
| Pigment Content | 12.0 | 12.0 | 12.0 | 12.0 | 12.0 | 12.0 | 12.0 | 12.0 | 12.0 | 12.0 |
| Resin content | 8.0 | 8.0 | 6.0 | 8.0 | 8.0 | 8.0 | 8.0 | 8.0 | 8.0 | 8.0 |

TABLE 5

Composition and properties of ink

| | Examples | | | | | | | | |
|---|---|---|---|---|---|---|---|---|---|
| | 1 | 2 | 3 | 4 | 5 | 6 | 7 | 8 | 9 |
| Pigment dispersion liquid 1 | 25.0 | 25.0 | 25.0 | 25.0 | 25.0 | 25.0 | 25.0 | 25.0 | 25.0 |
| Pigment dispersion liquid 7 | | | | | | | | | |
| Pigment dispersion liquid 8 | | | | | | | | | |
| Pigment dispersion liquid 9 | | | | | | | | | |
| 10.0% aqueous solution of random copolymer A1 | 4.0 | 4.0 | 4.0 | 4.0 | 4.0 | 4.0 | 4.0 | 4.0 | 4.0 |
| 10.0% aqueous solution of random copolymer A2 | | | | | | | | | |
| 10.0% aqueous solution of random copolymer A3 | | | | | | | | | |
| Glycerin | 10.0 | 10.0 | 10.0 | 10.0 | 10.0 | 10.0 | 10.0 | 10.0 | 10.0 |
| Trimethylol propane | 7.0 | 7.0 | 7.0 | 7.0 | 7.0 | 7.0 | 7.0 | 7.0 | 7.0 |
| 2-pyrrolidone | 3.0 | 3.0 | 3.0 | 3.0 | 3.0 | 3.0 | 3.0 | 3.0 | 3.0 |
| Citric acid | 0.024 | | | | | | | | |
| Ethylenediamine tetraacetic acid | | 0.036 | | | | | | | |
| Ethylenediamine-N,N'-diacetic acid | | | 0.022 | | | | | | |
| Maleic acid | | | | 0.014 | | | | | |
| Succinic acid | | | | | 0.015 | | | | |
| Malonic acid | | | | | | 0.013 | | | |
| Adipic acid | | | | | | | 0.018 | | |
| Glutaric acid | | | | | | | | 0.016 | |
| Cyclohexane-1,1-dicarboxylic acid | | | | | | | | | 0.021 |
| Trans-1,2-cyclohexane diamine tetraacetic acid | | | | | | | | | |
| Acetylenol E100 | 0.8 | 0.8 | 0.8 | 0.8 | 0.8 | 0.8 | 0.8 | 0.8 | 0.8 |
| Ion exchange water | 50.176 | 50.164 | 50.178 | 50.186 | 50.185 | 50.187 | 50.182 | 50.184 | 50.179 |
| Acid value of resin A [mgKOH/g] | 160 | 160 | 160 | 160 | 160 | 160 | 160 | 160 | 160 |
| Content of resin A [%] | 0.40 | 0.40 | 0.40 | 0.40 | 0.40 | 0.40 | 0.40 | 0.40 | 0.40 |
| Acid value of resin B [mgKOH/g] | 190 | 190 | 190 | 190 | 190 | 190 | 190 | 190 | 190 |
| Content of resin B [%] | 2.00 | 2.00 | 2.00 | 2.00 | 2.00 | 2.00 | 2.00 | 2.00 | 2.00 |
| pKa of polybasic acid | 2.9 | 2.0 | 2.4 | 1.8 | 4.0 | 2.6 | 4.3 | 4.1 | 3.3 |
| | 4.4 | 2.7 | 6.6 | 5.8 | 5.2 | 5.3 | 5.0 | 5.0 | 5.7 |
| | 5.7 | 6.4 | | | | | | | |
| | | 10.3 | | | | | | | |
| Molecular weight of polybasic acid | 192.12 | 292.24 | 176.17 | 116.07 | 118.09 | 104.06 | 146.14 | 132.12 | 172.18 |
| Acid value of resin A/Acid value of resin B | 0.84 | 0.84 | 0.84 | 0.84 | 0.84 | 0.84 | 0.84 | 0.84 | 0.84 |
| Content of resin A/Content of resin B [times] | 0.20 | 0.20 | 0.20 | 0.20 | 0.20 | 0.20 | 0.20 | 0.20 | 0.20 |
| Carboxy group amount x of resin A [mmol/kg] | 11.41 | 11.41 | 11.41 | 11.41 | 11.41 | 11.41 | 11.41 | 11.41 | 11.41 |
| Functional group amount y of polybasic acid [mmol/kg] | 1.249 | 1.232 | 1.249 | 1.206 | 1.270 | 1.249 | 1.232 | 1.211 | 1.220 |
| y/x | 0.110 | 0.108 | 0.109 | 0.106 | 0.111 | 0.110 | 0.108 | 0.106 | 0.107 |

| | Examples | | | | | |
|---|---|---|---|---|---|---|
| | 10 | 11 | 12 | 13 | 14 | 15 |
| Pigment dispersion liquid 1 | 25.0 | | | | 25.0 | 25.0 |
| Pigment dispersion liquid 7 | | 25.0 | | | | |
| Pigment dispersion liquid 8 | | | 25.0 | | | |
| Pigment dispersion liquid 9 | | | | 25.0 | | |
| 10.0% aqueous solution of random copolymer A1 | 4.0 | 4.0 | 4.0 | 4.0 | | |
| 10.0% aqueous solution of random copolymer A2 | | | | | | 4.0 |
| 10.0% aqueous solution of random copolymer A3 | | | | | 4.0 | |
| Glycerin | 10.0 | 10.0 | 10.0 | 10.0 | 10.0 | 10.0 |
| Trimethylol propane | 7.0 | 7.0 | 7.0 | 7.0 | 7.0 | 7.0 |
| 2-pyrrolidone | 3.0 | 3.0 | 3.0 | 3.0 | 3.0 | 3.0 |
| Citric acid | | 0.024 | 0.024 | 0.024 | 0.024 | 0.024 |
| Ethylenediamine tetraacetic acid | | | | | | |
| Ethylenediamine-N,N'-diacetic acid | | | | | | |
| Maleic acid | | | | | | |
| Succinic acid | | | | | | |
| Malonic acid | | | | | | |
| Adipic acid | | | | | | |
| Glutaric acid | | | | | | |
| Cyclohexane-1,1-dicarboxylic acid | | | | | | |
| Trans-1,2-cyclohexane diamine tetraacetic acid | 0.043 | | | | | |
| Acetylenol E100 | 0.8 | 0.8 | 0.8 | 0.8 | 0.8 | 0.8 |
| Ion exchange water | 50.157 | 50.176 | 50.176 | 50.176 | 50.176 | 50.176 |
| Acid value of resin A [mgKOH/g] | 160 | 160 | 160 | 160 | 108 | 120 |
| Content of resin A [%] | 0.40 | 0.40 | 0.40 | 0.40 | 0.40 | 0.40 |
| Acid value of resin B [mgKOH/g] | 190 | 190 | 190 | 190 | 190 | 190 |
| Content of resin B [%] | 2.00 | 2.00 | 2.00 | 2.00 | 2.00 | 2.00 |
| pKa of polybasic acid | 2.4 | 2.9 | 2.9 | 2.9 | 2.9 | 2.9 |
| | 3.4 | 4.4 | 4.4 | 4.4 | 4.4 | 4.4 |
| | 5.9 | 5.7 | 5.7 | 5.7 | 5.7 | 5.7 |
| | 11.8 | | | | | |
| Molecular weight of polybasic acid | 346.00 | 192.12 | 192.12 | 192.12 | 192.12 | 192.12 |
| Acid value of resin A/Acid value of resin B | 0.84 | 0.84 | 0.84 | 0.84 | 0.57 | 0.63 |

TABLE 5-continued

| Composition and properties of ink | | | | | | |
|---|---|---|---|---|---|---|
| Content of resin A/Content of resin B [times] | 0.20 | 0.20 | 0.20 | 0.20 | 0.20 | 0.20 |
| Carboxy group amount x of resin A [mmol/kg] | 11.41 | 11.41 | 11.41 | 11.41 | 7.70 | 8.55 |
| Functional group amount y of polybasic acid [mmol/kg] | 1.243 | 1.249 | 1.249 | 1.249 | 1.249 | 1.249 |
| y/x | 0.109 | 0.110 | 0.110 | 0.110 | 0.162 | 0.146 |

TABLE 6

Composition and properties of ink

| | Examples |||||||||
|---|---|---|---|---|---|---|---|---|---|
| | 16 | 17 | 18 | 19 | 20 | 21 | 22 | 23 | 24 |
| Pigment dispersion liquid 1 | | 25.0 | 25.0 | 25.0 | | | 25.0 | 25.0 | 25.0 |
| Pigment dispersion liquid 2 | 25.0 | | | | | | | | |
| Pigment dispersion liquid 3 | | | | | 25.0 | 25.0 | | | |
| Pigment dispersion liquid 10 | | | | | | | | | |
| 10.0% aqueous solution of random copolymer A1 | | 0.8 | 1.0 | 15.0 | 22.5 | 30.0 | 4.0 | 4.0 | |
| 10.0% aqueous solution of random copolymer A2 | 4.0 | | | | | | | | 4.0 |
| Glycerin | 10.0 | 10.0 | 10.0 | 10.0 | 10.0 | 10.0 | 10.0 | 10.0 | 10.0 |
| Trimethylol propane | 7.0 | 7.0 | 7.0 | 7.0 | 7.0 | 7.0 | 7.0 | 7.0 | 7.0 |
| 2-pyrrolidone | 3.0 | 3.0 | 3.0 | 3.0 | 3.0 | 3.0 | 3.0 | 3.0 | 3.0 |
| Citric acid | 0.024 | 0.024 | 0.024 | 0.024 | 0.024 | 0.024 | 0.238 | 0.178 | 0.119 |
| Acetylenol E100 | 0.8 | 0.8 | 0.8 | 0.8 | 0.8 | 0.8 | 0.8 | 0.8 | 0.8 |
| Ion exchange water | 50.176 | 53.376 | 53.176 | 39.176 | 31.676 | 24.176 | 49.962 | 50.022 | 50.081 |
| Acid value of resin A [mgKOH/g] | 120 | 160 | 160 | 160 | 160 | 160 | 160 | 160 | 120 |
| Content of resin A [%] | 0.40 | 0.08 | 0.10 | 1.50 | 2.25 | 3.00 | 0.40 | 0.40 | 0.40 |
| Acid value of resin B [mgKOH/g] | 140 | 190 | 190 | 190 | 190 | 190 | 190 | 190 | 190 |
| Content of resin B [%] | 2.00 | 2.00 | 2.00 | 2.00 | 1.50 | 1.50 | 2.00 | 2.00 | 2.00 |
| pKa of polybasic acid | 2.9 | 2.9 | 2.9 | 2.9 | 2.9 | 2.9 | 2.9 | 2.9 | 2.9 |
| | 4.4 | 4.4 | 4.4 | 4.4 | 4.4 | 4.4 | 4.4 | 4.4 | 4.4 |
| | 5.7 | 5.7 | 5.7 | 5.7 | 5.7 | 5.7 | 5.7 | 5.7 | 5.7 |
| Molecular weight of polybasic acid | 192.12 | 192.12 | 192.12 | 192.12 | 192.12 | 192.12 | 192.12 | 192.12 | 192.12 |
| Acid value of resin A/Acid value of resin B | 0.86 | 0.84 | 0.84 | 0.84 | 0.84 | 0.84 | 0.84 | 0.84 | 0.63 |
| Content of resin A/Content of resin B [times] | 0.20 | 0.04 | 0.05 | 0.75 | 1.50 | 2.00 | 0.20 | 0.20 | 0.20 |
| Carboxy group amount x of resin A [mmol/kg] | 8.55 | 2.28 | 2.85 | 42.77 | 64.16 | 85.55 | 11.41 | 11.41 | 8.55 |
| Functional group amount y of polybasic acid [mmol/kg] | 1.249 | 1.249 | 1.249 | 1.249 | 1.249 | 1.249 | 12.388 | 9.265 | 6.194 |
| y/x | 0.146 | 0.548 | 0.438 | 0.029 | 0.019 | 0.015 | 1.086 | 0.812 | 0.724 |

| | Examples |||| Reference Examples ||
|---|---|---|---|---|---|---|
| | 25 | 26 | 27 | 28 | 1 | 2 |
| Pigment dispersion liquid 1 | 25.0 | 25.0 | 25.0 | 25.0 | | 25.0 |
| Pigment dispersion liquid 2 | | | | | | |
| Pigment dispersion liquid 3 | | | | | | |
| Pigment dispersion liquid 10 | | | | | 25.0 | |
| 10.0% aqueous solution of random copolymer A1 | 4.0 | 4.0 | 5.0 | 5.0 | 4.0 | 4.0 |
| 10.0% aqueous solution of random copolymer A2 | | | | | | |
| Glycerin | 10.0 | 10.0 | 10.0 | 10.0 | 10.0 | 10.0 |
| Trimethylol propane | 7.0 | 7.0 | 7.0 | 7.0 | 7.0 | 7.0 |
| 2-pyrrolidone | 3.0 | 3.0 | 3.0 | 3.0 | 3.0 | 3.0 |
| Citric acid | 0.119 | 0.047 | 0.0036 | 0.003 | 0.024 | |
| Acetylenol E100 | 0.8 | 0.8 | 0.8 | 0.8 | 0.8 | 0.8 |
| Ion exchange water | 50.081 | 50.153 | 49.1964 | 49.197 | 50.176 | 50.200 |
| Acid value of resin A [mgKOH/g] | 160 | 160 | 160 | 160 | 160 | 160 |
| Content of resin A [%] | 0.40 | 0.40 | 0.50 | 0.50 | 0.40 | 0.4 |
| Acid value of resin B [mgKOH/g] | 190 | 190 | 190 | 190 | 190 | 190 |
| Content of resin B [%] | 2.00 | 2.00 | 2.00 | 2.00 | 2.00 | 2.00 |
| pKa of polybasic acid | 2.9 | 2.9 | 2.9 | 2.9 | 2.9 | — |
| | 4.4 | 4.4 | 4.4 | 4.4 | 4.4 | |
| | 5.7 | 5.7 | 5.7 | 5.7 | 5.7 | |
| Molecular weight of polybasic acid | 192.12 | 192.12 | 192.12 | 192.12 | 192.12 | — |
| Acid value of resin A/Acid value of resin B | 0.84 | 0.84 | 0.84 | 0.84 | 0.84 | 0.84 |
| Content of resin A/Content of resin B [times] | 0.20 | 0.20 | 0.25 | 0.25 | 0.20 | 0.20 |
| Carboxy group amount x of resin A [mmol/kg] | 11.41 | 11.41 | 14.26 | 14.26 | 11.41 | 11.41 |
| Functional group amount y of polybasic acid [mmol/kg] | 6.194 | 2.446 | 0.187 | 0.156 | 1.249 | — |
| y/x | 0.543 | 0.214 | 0.013 | 0.011 | 0.110 | — |

TABLE 7

Composition and properties of ink

| | Comparative Examples | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Pigment dispersion liquid 1 | 25.0 | | | | | | 25.0 | 25.0 | 25.0 | 25.0 | 25.0 | 25.0 | 25.0 | 25.0 | 25.0 | 25.0 |
| Pigment dispersion liquid 4 | | | | | 25.0 | | | | | | | | | | | |
| Pigment dispersion liquid 5 | | | 25.0 | | | | | | | | | | | | | |
| Pigment dispersion liquid 6 | | 25.0 | | 25.0 | | 25.0 | | | | | | | | | | |
| 10.0% aqueous solution of random copolymer A1 | | | | | | | 4.0 | 4.0 | 4.0 | 4.0 | 4.0 | 4.0 | 4.0 | 4.0 | 4.0 | 4.0 |
| 10.0% aqueous solution of random copolymer A4 | | | | | 4.0 | | | | | | | | | | | |
| 10.0% aqueous solution of block copolymer B1 | | | 4.0 | | | 4.0 | | | | | | | | | | |
| 10.0% aqueous solution of block copolymer B3 | | | | 4.0 | | | | | | | | | | | | |
| Glycerin | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Trimethylol propane | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| 2-pyrrolidone | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Citric acid | 0.024 | 0.024 | 0.024 | 0.024 | 0.024 | 0.024 | | | | | | | | | | |
| Dihydroxysuccinic acid | | | | | | | 0.019 | | | | | | | | | |
| Fumaric acid | | | | | | | | 0.014 | | | | | | | | |
| Malic acid | | | | | | | | | 0.017 | | | | | | | |
| Phthalic acid | | | | | | | | | | 0.021 | | | | | | |
| Nitrilotriacetic acid | | | | | | | | | | | 0.024 | | | | | |
| Lactic acid | | | | | | | | | | | | 0.011 | | | | 0.011 |
| Dimethylmalonic acid | | | | | | | | | | | | | 0.016 | | | |
| Valeric acid | | | | | | | | | | | | | | 0.013 | | |
| Cyclohexane carboxylic acid | | | | | | | | | | | | | | | 0.016 | 0.016 |
| Acetylenol E100 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Ion exchange water | 54.176 | 54.176 | 50.176 | 50.176 | 50.176 | 50.176 | 50.181 | 50.186 | 50.183 | 50.179 | 50.176 | 50.189 | 50.184 | 50.187 | 50.184 | 50.173 |
| Acid value of resin A [mgKOH/g] | — | — | 190 | 160 | 190 | 190 | 160 | 160 | 160 | 160 | 160 | 160 | 160 | 160 | 160 | 160 |
| Content of resin A [%] | 0.00 | 0.00 | 0.40 | 0.40 | 0.40 | 0.40 | 0.40 | 0.40 | 0.40 | 0.40 | 0.40 | 0.40 | 0.40 | 0.40 | 0.40 | 0.40 |
| Acid value of resin B [mgKOH/g] | 190 | 190 | 160 | 190 | 160 | 190 | 190 | 190 | 190 | 190 | 190 | 190 | 190 | 190 | 190 | 190 |
| Content of resin B [%] | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| pKa of polybasic acid | 2.9<br>4.4<br>5.7 | 2.9<br>4.4<br>5.7 | 2.9<br>4.4<br>5.7 | 2.9<br>4.4<br>5.7 | 2.9<br>4.4<br>5.7 | 2.9<br>4.4<br>5.7 | 2.9<br>4.0 | 3.1<br>4.6 | 3.2<br>4.8 | 2.8<br>4.9 | 1.7<br>2.5<br>9.7 | 3.6 | 5.7<br>8.7 | 5.2 | 6.6 | 3.6<br>6.6 |
| Molecular weight of polybasic acid | 192.12 | 192.12 | 192.12 | 192.12 | 192.12 | 192.12 | 150.09 | 116.07 | 134.09 | 166.13 | 191.14 | 90.08 | 132.12 | 102.13 | 128.17 | 90.08<br>128.17 |
| Acid value of resin A/Acid value of resin B | — | — | 1.19 | 0.84 | 1.19 | 1.00 | 0.84 | 0.84 | 0.84 | | | | | | | |
| Content of resin A/Content of resin B [times] | 0.00 | 0.00 | 0.20 | 0.20 | 0.20 | 0.20 | 0.20 | 0.20 | 0.20 | | | | | | | |
| Carboxy group amount x of resin A [mmol/kg] | — | — | 13.54 | 11.41 | 13.54 | 13.54 | 11.41 | 11.41 | 11.41 | | | | | | | |
| Functional group amount y of polybasic acid [mmol/kg] | 1.249 | 1.249 | 1.249 | 1.249 | 1.249 | 1.249 | — | — | — | | | | | | | |
| y/x | — | — | 0.092 | 0.110 | 0.092 | 0.092 | — | — | — | | | | | | | |

TABLE 7-continued

| Composition and properties of ink | | | | | | | |
|---|---|---|---|---|---|---|---|
| Acid value of resin A/Acid value of resin B | 0.84 | 0.84 | 0.84 | 0.84 | 0.84 | 0.84 | 0.84 |
| Content of resin A/Content of resin B [times] | 0.20 | 0.20 | 0.20 | 0.20 | 0.20 | 0.20 | 0.20 |
| Carboxy group amount x of resin A [mmol/kg] | 11.41 | 11.41 | 11.41 | 11.41 | 11.41 | 11.41 | 11.41 |
| Functional group amount y of polybasic acid [mmol/kg] | — | — | — | 1.211 | 1.273 | 1.248 | 2.107 |
| y/x | — | — | — | 0.106 | 0.112 | 0.109 | 0.185 |

Evaluation
Ejection Rate

The inks obtained above were evaluated for the ejection rate as follows. The state of the inks ejected from ejection orifices by applying a certain drive voltage to an ink jet recording head were photographed by a CCD camera from the direction (transverse direction) orthogonal to the ejection direction of the ink, and then the ejection rate was calculated. Specifically, the light emission interval of a stroboscope and the photographing interval were synchronized, and the stroboscope was made to emit light at a very short interval. During the operation, a drive voltage for ejection was applied. Then, when a given time passed from the application of the drive voltage, the distance (μm) between the surface in which the ejection orifices were provided of the recording head and the center of gravity of the ejected ink droplets was determined from the shot data, and the ejection rate was calculated from the distance and the light emission interval (μsecond) of the stroboscope. The measurement of the ejection rate was performed for three ejection orifices, and the average was defined as the measurement value. As a control example, in the case where the inks of Reference Example 1 in which a reduction in the ejection properties did not occur because a metal phthalocyanine pigment which was not halogenated was contained were used and the ejection rate of the inks was adjusted to 100, the ejection rate of each ink was determined as a relative value, and the ejection rate was evaluated based on the relative values. The evaluation criteria of the ejection rate are as follows. The evaluation results are shown in Table 8. According to aspects of the invention, the levels of D or lower were not permissible levels and the levels of C or higher were permissible levels. A: Relative value of 95 or more. B: Relative value of 90 or more and less than 95. C: Relative value of 80 or more and less than 90. D: Relative value of 70 or more and less than 80. E: Relative value of 60 or more and less than 70. F: Relative value of less than 60.

Deposit

The inks obtained above were evaluated for the deposits as follows. Using an ink jet recording head, 20,000,000 ink droplets per one ejection orifice were ejected from 80 ejection orifices near the center of the row of the ejection orifices at a drive frequency of 2 kHz. Thereafter, the ejection orifices of the recording head were observed under an optical microscope to be evaluated based on the state of the deposits. The evaluation criteria of the deposits are as follows. The evaluation results are shown in Table 8. According to aspects of the invention, the levels of D or lower were not permissible levels and the levels of C or higher were permissible levels.
A: No deposits were generated at all the ejection orifices.
B: The ratio of ejection orifices where deposits were generated was less than 5%.
C: The ratio of ejection orifices where deposits were generated was 5% or more and less than 20%.
D: The ratio of the ejection orifices where deposits were generated was 20% or more and less than 50%.
E: The ratio of the ejection orifices where deposits were generated was 50% or more.

TABLE 8

| Evaluation results | | | |
|---|---|---|---|
| | | Ejection rate | Deposit |
| Examples | 1 | A | A |
| | 2 | A | A |
| | 3 | A | A |
| | 4 | A | A |
| | 5 | A | A |
| | 6 | A | A |
| | 7 | A | A |
| | 8 | A | A |
| | 9 | A | A |
| | 10 | B | A |
| | 11 | A | A |
| | 12 | A | A |
| | 13 | A | A |
| | 14 | A | C |
| | 15 | A | A |
| | 16 | C | A |
| | 17 | B | C |
| | 18 | A | A |
| | 19 | A | A |
| | 20 | A | A |
| | 21 | A | C |
| | 22 | A | C |
| | 23 | A | A |
| | 24 | A | A |
| | 25 | A | A |
| | 26 | A | A |
| | 27 | A | A |
| | 28 | C | B |
| Reference Examples | 1 | A | A |
| | 2 | D | D |
| Comparative Examples | 1 | E | E |
| | 2 | F | E |
| | 3 | D | D |
| | 4 | D | E |
| | 5 | C | D |
| | 6 | E | E |
| | 7 | D | D |
| | 8 | C | E |
| | 9 | B | D |
| | 10 | B | D |
| | 11 | C | D |
| | 12 | E | D |
| | 13 | E | D |
| | 14 | D | D |
| | 15 | D | E |
| | 16 | D | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-258196 filed Nov. 18, 2010, which is hereby incorporated by reference herein in its entirety.

What is claimed is:

1. An ink jet ink comprising:
   a resin A,
   a resin B, and
   a pigment;
   wherein the pigment is a halogenated metal phthalocyanine pigment being dispersed by the resin B;
   the resin A is a random copolymer having a carboxy group, the resin B is a block copolymer having a carboxy group, the acid value of the resin A is less than the acid value of the resin B; and
   the ink further includes a polybasic acid having a functional group whose pKa is 4.3 or less and a functional group whose pKa is 5.0 or more and 6.6 or less.

2. The ink according to claim 1, wherein the acid value of the resin A is 0.60 or more and 0.85 or less in terms of a ratio to the acid value of the resin B.

3. The ink according to claim 1, wherein the content (% by mass) of the resin A in the ink is 0.05 times or more and 1.50 times or less in terms of a mass ratio to the content (% by mass) of the resin B.

4. The ink according to claim 1, wherein the amount (mmol/kg) of the functional group in which the pKa of the polybasic acid is 5.0 or more and 6.6 or less is 0.013 or more and 1.0 or less in terms of a ratio to the amount (mmol/kg) of the carboxy group of the resin A.

5. The ink according to claim 1, wherein the molecular weight of the polybasic acid is 300 or less.

6. An ink cartridge comprising an ink storing portion for storing ink,
   the ink stored in the ink storing portion is the ink according to claim 1.

7. An ink jet recording method comprising ejecting ink by an ink jet method, and recording an image on a recording medium,
   wherein the ink is the ink according to claim 1.

8. The ink according to claim 1, wherein the content (% by mass) of the halogenated metal phthalocyanine pigment in the ink is 1.0% by mass or more and 20.0% by mass or less based on the total mass of the ink.

9. The ink according to claim 1, wherein the content (% by mass) of the resin A in the ink is 0.1% by mass or more and 5.0% by mass or less based on the total mass of the ink.

10. The ink according to claim 1, wherein the content (% by mass) of the resin B in the ink is 0.1% by mass or more and 5.0% by mass or less based on the total mass of the ink.

11. The ink according to claim 1, wherein the content (% by mass) of the polybasic acid in the ink is 0.0010% by mass or more and 0.500% by mass or less based on the total mass of the ink.

12. The ink according to claim 1, wherein the halogenated metal phthalocyanine pigment comprises at least one of the group consisting of C.I. Pigment Green 7, C.I. Pigment Green 36, C.I. Pigment Green 37 and C.I. Pigment Green 58.

13. The ink according to claim 1, wherein the acid value of the resin A is 100 mgKOH/g or more and 180 mgKOH/g or less.

14. The ink according to claim 1, wherein the acid value of the resin B is 140 mgKOH/g or more and 250 mgKOH/g or less.

15. The ink according to claim 1, wherein the polybasic acid comprises at least one of the group consisting of citric acid, ethylenediamine tetraacetic acid, ethylenediamine-N,N'-diacetic acid, Maleic acid, succinic acid, malonic acid, adipic acid, glutaric acid, cyclohexane-1,1-dicarboxylic acid and trans-1,2-cyclohexane diamine tetraacetic acid.

* * * * *